United States Patent [19]

Kirkpatrick

[11] Patent Number: 4,970,496
[45] Date of Patent: Nov. 13, 1990

[54] VEHICULAR MONITORING SYSTEM

[75] Inventor: Robert B. Kirkpatrick, Indianapolis, Ind.

[73] Assignee: Lee Mechanical, Inc., Indianapolis, Ind.

[21] Appl. No.: 404,786

[22] Filed: Sep. 8, 1989

[51] Int. Cl.[5] .................. G08B 17/00; F25B 49/00
[52] U.S. Cl. .................................. 340/585; 62/127; 340/435; 340/545; 340/586; 340/588; 364/557
[58] Field of Search ........... 340/585, 588, 533, 870.17, 340/449, 903, 943, 932.2, 435, 586, 545; 367/93-94; 364/557, 561, 569, 558; 374/170; 62/125-131

[56] References Cited

U.S. PATENT DOCUMENTS

| | | | |
|---|---|---|---|
| 4,385,289 | 5/1983 | McMillan | 340/585 |
| 4,463,348 | 7/1984 | Sidebottom | 340/585 |
| 4,694,295 | 9/1987 | Miller et al. | 340/435 X |
| 4,790,143 | 12/1988 | Hanson | 62/126 |
| 4,798,055 | 1/1989 | Murray et al. | 62/127 |
| 4,882,564 | 11/1989 | Monroe et al. | 340/585 X |

Primary Examiner—Joseph A. Orsino
Assistant Examiner—Thomas J. Mullen, Jr.
Attorney, Agent, or Firm—Willian Brinks Olds Hofer Gilson & Lione

[57] ABSTRACT

In refrigerator tractor/trailer vehicles, a data acquisition module is connected with one or more temperature sensors adapted for measurement of the temperatures within the trailer and may be connected with one or more distance sensors and "door open" sensors located in the trailer. Such a data acquisition module preferably comprises a microprocessor and random access memory connected with a plurality of sensors and adapted to acquire stored data on temperatures within the trailer and further connected with clock means to provide time data associated with the temperature data. In such systems, a control and display module, which comprises a separate portable control and display unit, can provide temperature data and distance data to the vehicle operator, warnings to the vehicle operator if the temperature of the trailer approaches unacceptable limits, warnings during backing of the trailer of impending collision with an object and warnings if the trailer doors are opened without authority. The control and display module provides controls for operation of the system, a digital readout, and an audible alarm.

27 Claims, 11 Drawing Sheets

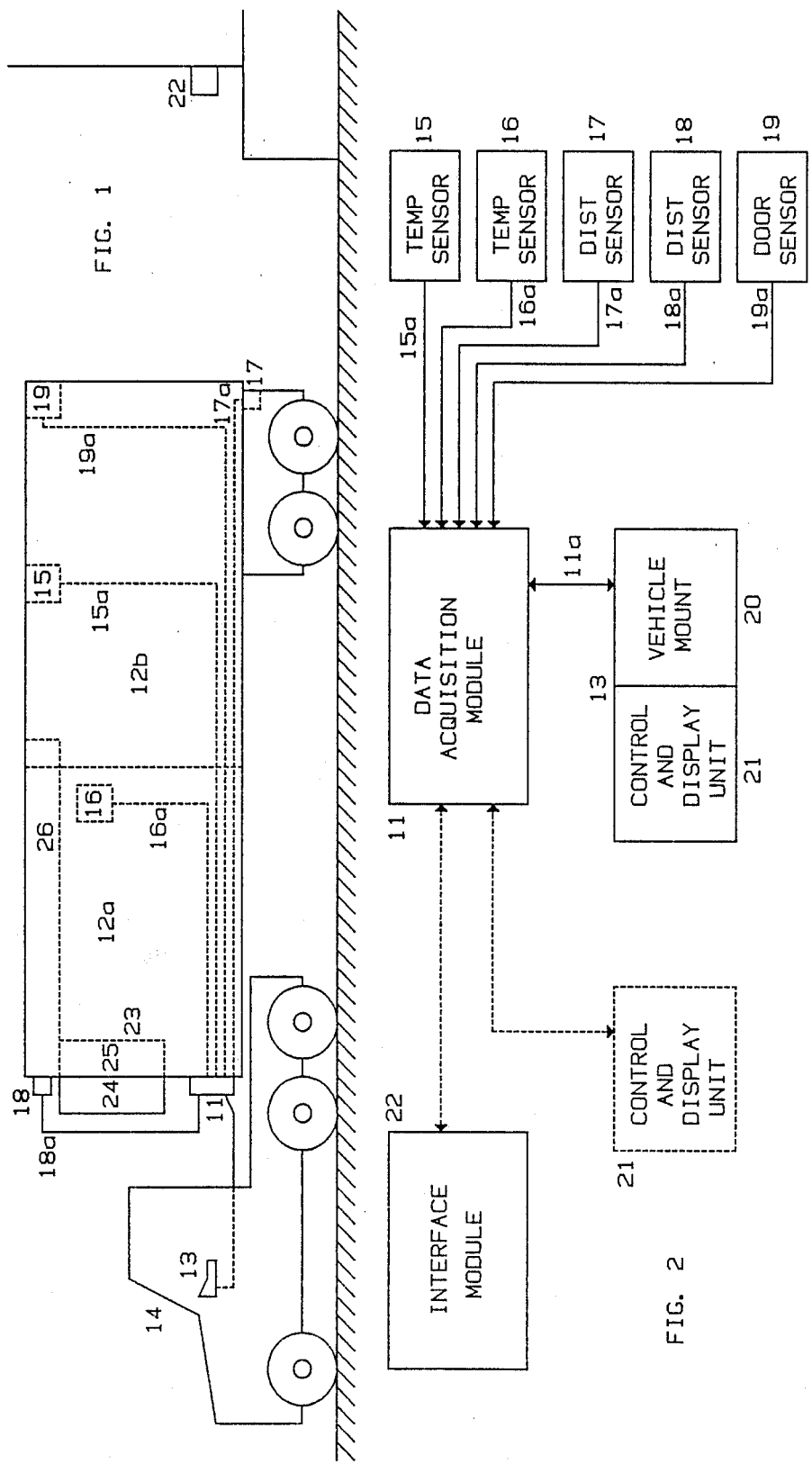

VEHICULAR MONITORING SYSTEM

TECHNICAL FIELD

This invention relates to systems for monitoring the operating conditions of ancillary vehicle equipment, including systems to monitor and to assist in the operation of tractor-trailer vehicles, with the capability, for example, of providing time/temperature records of refrigerated vehicle compartments and their contents.

BACKGROUND ART

A number of systems have been suggested for sensing the temperature within a refrigerated trailer and providing an output dependent upon the temperature within the trailer.

U.S. Pat. No. 4,024,495, for example, discloses a remote temperature-warning system for refrigerated vehicles that uses the existing electrical wiring of the vehicle. A visual temperature indicator is installed within the cab of the tractor to allow the driver to continuously monitor the temperature within the refrigerated compartment. An audio alarm is activated when the temperature measured within the refrigerated compartment exceeds a predetermined temperature.

U.S. Pat. No. 4,385,289 discloses a system for sensing the temperature within a refrigerated trailer and actuating an alarm when the temperature exceeds a preselected temperature. This system includes a control for switching between off, test and alarm modes of the system.

U.S. Pat. Nos. 3,363,231; 3,594,752; and 4,455,096 are directed to other devices for sensing the temperature within a tractor/trailer.

A number of systems have also been disclosed for sensing the distance between a vehicle and other objects. For example, U.S. Pat. No. 3,226,627 discloses a system to indicate the presence of an object and the distance between the object and the vehicle when the vehicle is being backed. The system uses sonar devices and presents the distance data by energizing a light bulb which flashes intermittently to indicate the distance between the vehicle and an object.

U.S. Pat. No. 3,681,750 discloses an ultrasonic vehicle detection device for indicating the presence of other vehicles in blind zones rearward of the vehicle. The apparatus of U.S. Pat. No. 3,681,750 includes a signal lamp to indicate the presence of a vehicle in such areas.

U.S. Pat. No. 3,732,555 discloses a radar system for aiding and maneuvering a truck at an unloading platform by operating a signal light to indicate to the driver that the truck is within a predetermined distance, for example, two to four feet of the loading dock as the vehicle is being backed.

U.S. Pat. No. 4,240,152 also discloses a system for locating and determining the distance of an object from a vehicle to avoid collisions during movement of the vehicle under low-overhanging structures. The system of U.S. Pat. No. 4,240,152 includes ultrasonic transmitters and receivers and a digital readout for indicating the distance of the vehicle from an object and warning devices for warning of an imminent collision. U.S. Pat. No. 4,240,152 indicates that the system may measure the distance of objects in front of or on top of the vehicle.

U.S. Pat. Nos. 3,226,673; 3,442,347; 3,360,775; 3,842,396; 4,015,232; 4,349,823; 4,442,512; 4,467,313; 4,528,563; and 4,694,297 also disclose systems to detect and warn the driver of objects within a predetermined distance of the vehicle.

DISCLOSURE OF INVENTION

This invention is a system with multiple capabilities to monitor the operation of ancillary equipment and devices of a vehicle system and is particularly adapted for use with tractor/trailer vehicles to provide assistance in the operation of the vehicle and to monitor and provide a record of the operation of ancillary equipment important in the proper operation of the vehicle. With refrigerated trailers the system of the invention can provide records of the temperatures of articles when loaded into the refrigerated trailer, throughout their transportation by the trailer, and upon delivery from the trailer.

The system of the invention comprises a first means, or data acquisition module, for acquiring and storing data related to the operation of ancillary equipment of the vehicle; and second means, or control and display module, for providing data to the vehicle operator relating to operation of the vehicle ancillary equipment; for providing control of the system by the vehicle operator; and for warning the vehicle operator of unacceptable conditions of operation.

In refrigerator tractor/trailer vehicles, the first means, or data acquisition module, is connected with one or more temperature sensors adapted for measurement of the temperatures within the trailer and may be connected with one or more distance sensors and "door open" sensors located in the trailer. Such a data acquisition module preferably comprises a microprocessor and random access memory connected with a plurality of sensors and adapted to acquire stored data on temperatures within the trailer and further connected with clock means to provide time data associated with the temperature data. In such systems, the control and display module can provide temperature data and distance data to the vehicle operator, warnings to the vehicle operator if the temperature of the trailer approaches unacceptable limits, warnings during backing of the trailer of impending collision with an object and warnings if the trailer doors are opened without authority. The control and display module provides controls for operation of the system, a digital readout, and an audible alarm and preferably comprises a microprocessor and random access memory that connect with the data acquisition module and with one or more distance sensors.

In addition the second means can comprise a separate portable control and display module and a vehicle mounting unit, both adapted for connection to the data acquisition module. The separate portable control and display module comprises means for accepting and storing data relating to the operation of the ancillary equipment, including a time/temperature record of the interior of the refrigerated trailer, means for programming and providing information to the data acquisition module, and means for presenting data retrieved from the data acquisition module. The separate portable control and display unit of the invention may include a hand-held temperature probe adapted for connection with the data acquisition module, permitting the temperature of articles to be carried in the refrigerated compartment to be stored in the data acquisition module as the articles are loaded into the refrigerated compartment. Such a portable control and display unit may comprise means to measure and store article temperatures and the times the article temperatures are sensed, means for visually displaying the article temperatures, and means to accept and store data from the data acquisition model.

The system of invention may be provided with a separate interfacing means for reading and transmitting data stored in the data acquisition module, such as temperature and time data relating to a refrigerated trailer, to a second remote data processor or computer. Such interfacing means comprises a multiplexer to provide multiple channels of data for acceptance by a single computer.

Other features of the invention will be apparent from the drawings and description of the best mode of carrying out the invention which follow.

BRIEF DESCRIPTION OF DRAWINGS

FIG. 1 a diagrammatic illustration of the system of the invention incorporated into a tractor/trailer vehicle;

FIG. 2 is a block diagram of a simple system of the invention;

BEST MODE FOR CARRYING OUT THE INVENTION

Figure 3:
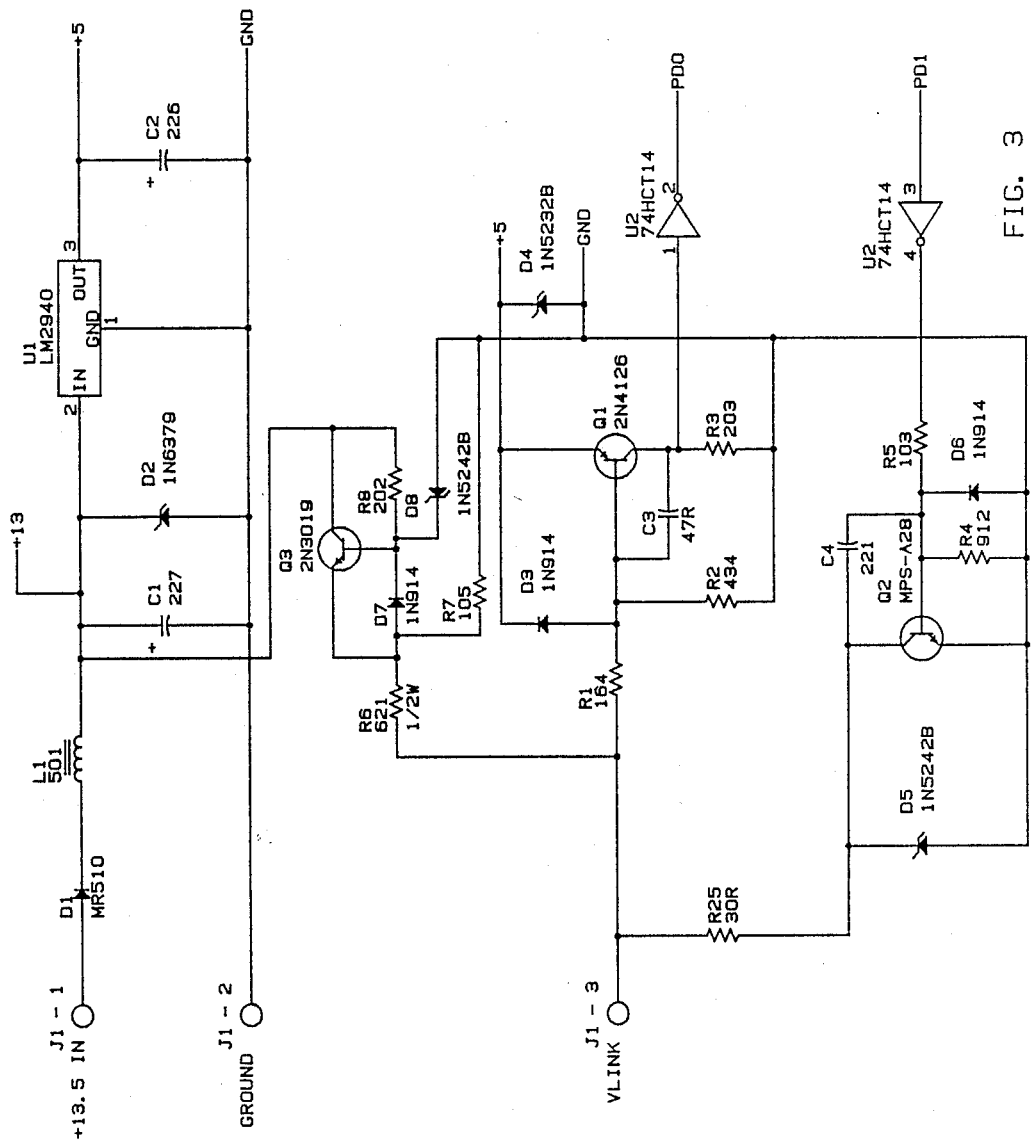
FIGS. 3-5 are circuit diagrams of the data acquisition module of the system of this invention.

FIGS. 1 and 2 disclose a preferred embodiment of the invention as installed in a tractor/trailer vehicle. As shown in FIGS. 1 and 2, a preferred system 10 of the invention may include a data acquisition module 11, shown installed on a trailer 12; a control and display module 13, shown installed in the cab of a tractor 14; one or more temperature sensors 15, 16, shown installed in trailer 12; one or more distance sensors 17, 18, shown installed on the trailer; and one or more door open sensors 19, also shown installed in trailer 12. As shown in FIG. 1, a plurality of sensors 15-19 is connected with the data acquisition module 11 by appropriate cabling or wiring 15a-19a, respectively. The data acquisition module and control and display module 13 are interconnected by appropriate cabling 11a from data acquisition module 11 at the front of trailer 12, to the control and display module 13 within tractor 14, as shown in FIG. 1.

As set forth below, control and display module 13 includes separate, portable, data acquisition, storage, and presentation unit 20 and vehicle mounting unit module 21. The separate portable control and display unit 21 is shown as detached from the vehicle mounting unit in dashed lines in FIG. 2.

The preferred embodiment of the invention described below is adapted to acquire and store data relating to ancillary refrigeration equipment 23 of trailer 12. For purposes of illustration of the invention, trailer 12 comprises a refrigerated trailer including a freezer compartment 12a in which temperature sensor 16 is located and a refrigerated compartment 12b in which temperature sensor 15 is located. Ancillary refrigerating equipment 23 comprises a compressor unit 24 located outside trailer 12 and an associated evaporator unit 25 located within freezer compartment 12a of trailer 12. Cold air for refrigerator compartment 12b is provided from evaporator 25 by a duct 26 which directs the cold air into refrigerator compartment 12b. In this preferred embodiment of the invention, system 10 is adapted to provide time/temperature records of the temperature within freezer compartment 12a, as sensed by sensor 16, and of refrigerated compartment 12b, as sensed by sensor 15. Although the system illustrated by FIGS. 1 and 2 include specifically two temperature sensors, any one or a plurality of temperature sensors may be used to provide information to the data acquisition module. In addition to temperature sensors for the air within a plurality of zones of refrigeration within a refrigerated vehicle, sensors may be placed within or on articles being carried within the refrigerated vehicle to provide a time/temperature record of article temperature and an indication of the temperature of the articles being carried.

In addition to monitoring temperatures within trailer 12, the exemplary systems shown in FIGS. 1 and 2 can record the times at which doors 12c of trailer 12 are opened and closed. The invention thus permits monitoring of ancillary vehicular equipment; and as shown in FIG. 1, is particularly valuable in monitoring the operation of refrigeration equipment 23 and the insulation provided in trailer 12 to maintain the articles loaded in trailer 12 at acceptable temperatures.

Figure 4:
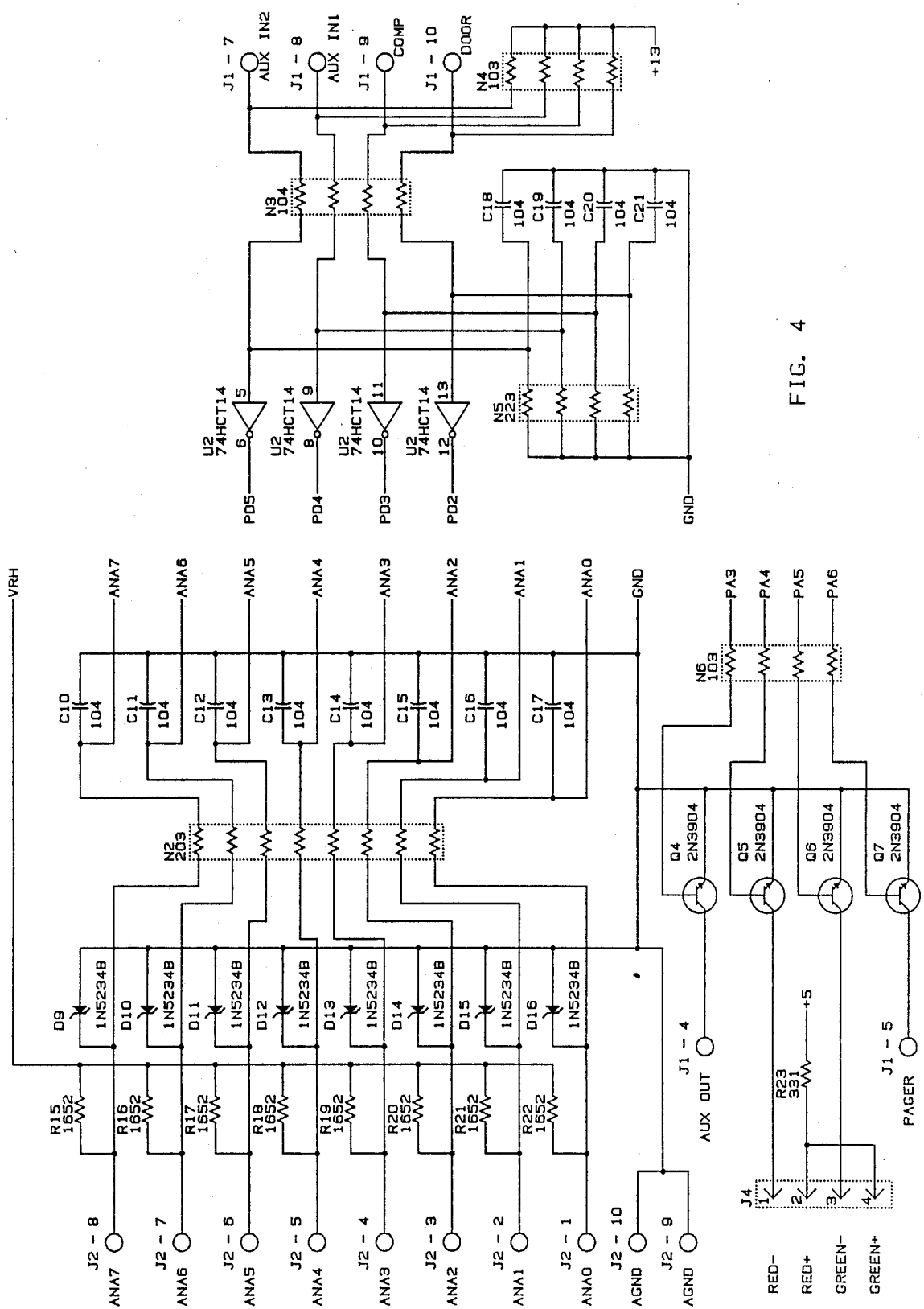
Figure 5:
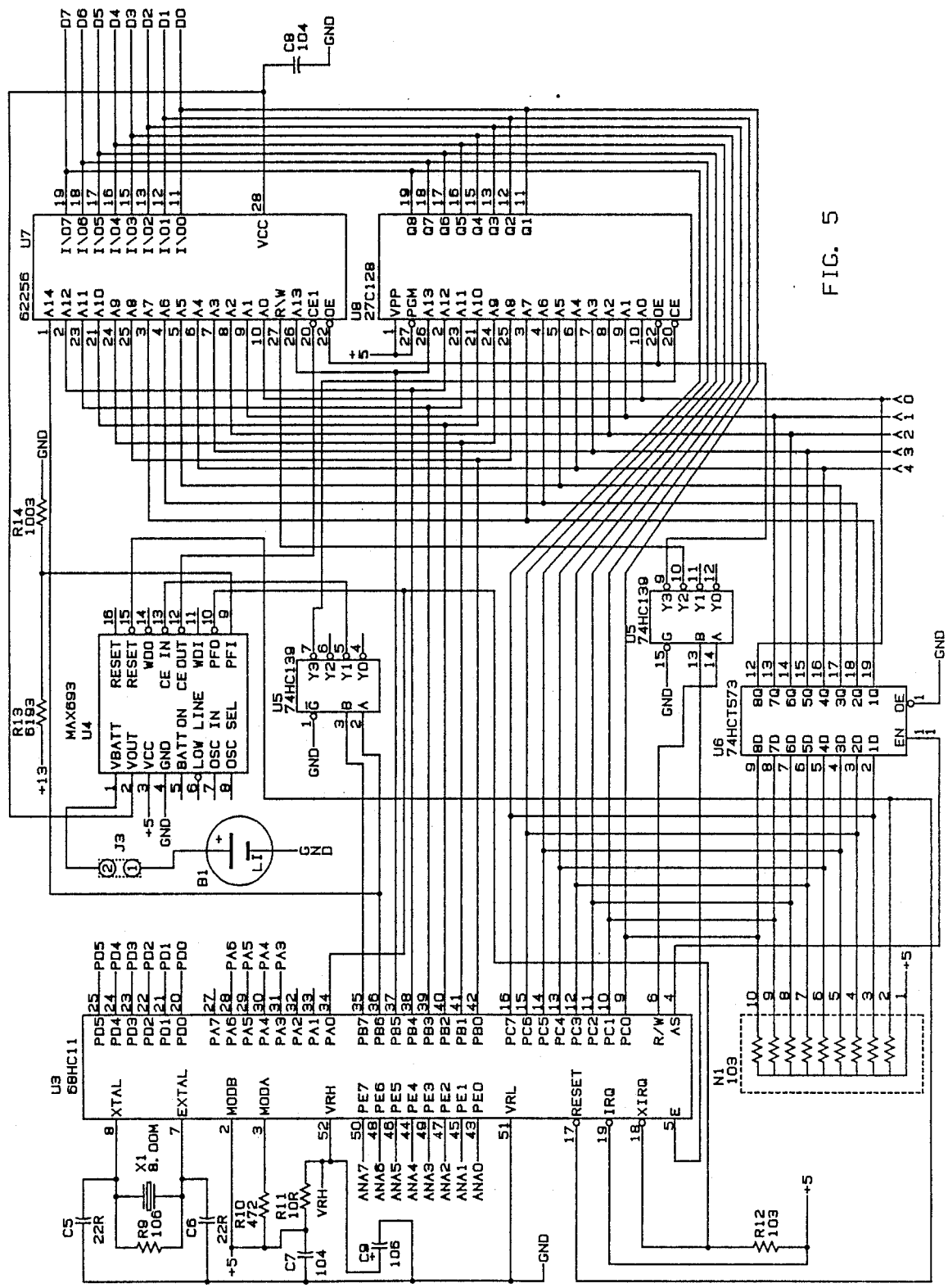

FIGS. 3, 4, and 5 are circuit diagrams of data acquisition unit 11 of this invention. The circuit of data acquisition module 11 shown on FIGS. 3, 4, and 5 is interconnected as indicated on the drawings. FIG. 3 shows the means supplying power to the circuit including a regulated five-volt D.C. output from a 13.5-volt D.C. input. Circuit portions shown on FIG. 3 include connections PD0 and PD1 which connect to the PD0 and PD1 connections, shown in FIG. 5, for the microprocessor unit U3 which is sold by Motorola under its No. 68HC11. The connections ANA0-ANA7 of microprocessor U3, shown in FIG. 5, connect with the corresponding ANA0-ANA7 connections shown in the circuit portion at the left of FIG. 4. The connections PA3-PA6 of microprocessor U3 shown in FIG. 5 connect to the corresponding connections PA3-PA6 of the circuit portion shown at the left of FIG. 4. The connections PD2-PD5 of microprocessor U3 shown in FIG. 5 connect respectively to connections PD2-PD5 of the circuit portion shown at the right of FIG. 4.

The terminals indicated by prefixes J1 and J2 (i.e., J1-1 through J1-12 and J2-1 through J2-12) indicate connector terminals for interconnection with other modules of the system.

The data acquisition circuit of FIGS. 3-5 is contained within an integrated data acquisition module designed to mount on the front of a refrigerated trailer as shown in FIG. 1 and to draw its operating power from refrigeration unit 23. Data acquisition module 11 is capable of measuring up to eight temperatures and/or pressures throughout the trailer system and recording up to one thousand time/temperature/pressure measurements automatically over selectable time periods from a few hours to several months. The time/temperature or time/pressure records are maintained even if the trailer battery is removed for maintenance. To conserve power, however, recording activity is stopped when the battery is removed.

Data acquisition module 11 is provided with connections for communication with other modules and computers that may attach to the system of the invention. For example, data acquisition module 11 is provided with connections permitting it to be connected with control and display module 13, which can serve as a remote display unit in the tractor of the tractor/trailer;

with the portable control and display unit 21; with handheld temperature probes, which can measure and record the temperatures of articles stored in the trailer directly; and with a central computer system of the trucking company. Data acquisition module 11 may be provided with a radio pager alarm to send alarms to the driver in the event the temperature of the trailer approaches unacceptable limits or the doors of the trailer are opened without authority. Data acquisition module 11 may also be programmed to provide alarms for high or low temperatures and for abnormal behavior of the compressor or evaporator of the refrigeration unit. Data acquisition module 11 may be programmed from the control module 13 when mounted in the tractor or from the portable control and display unit 21. Each data acquisition module can be provided with an unique identifying number accessible by a central computer system to allow tracking of the trailers in which the data acquisition module is installed. The data acquisition modules of FIGS. 3-5 provide the ability to monitor and diagnose abnormal compressor behavior by the installation of sensors to monitor compressor inlet and outlet pressures and compressor motor operating temperatures. By monitoring the compressor for abnormal behavior, impending compressor failures may be predicted while product temperatures are still within acceptable limits; and remedial action can be taken before refrigerated trailer loads are lost.

Data acquisition module 11 of the invention is preferably packaged in small, aluminum, weather-proof enclosures with an alarm indicator and connections for handheld module 21, interfacing module 22, and a plurality of sensors such as those shown as sensors 15–19 in FIGS. 1 and 2. Data acquisition module 11 can be designed to operate over the entire SE recommended external pressure range of −40 to ±185° F. (−40° to 85° C.).

As shown in FIG. 5, data acquisition module 11 also includes clock means for providing time data to the microprocessor. The microprocessor is programmed in a manner known in the art to sample the output of the system sensors and record the sensor outputs and the time associated with each of the outputs. The sensors may be any temperature or pressure sensors that are adapted to provide digital outputs of the temperature or pressure they sense. While the use of sensors with digital outputs is preferred, analog sensors may be used; and the data acquisition module may be provided with analog-to-digital conversion means to provide digital data to the microprocessor. The data acquisition module of FIGS. 3–5 thus provides means for acquisition storage of data connected with one or more temperature transducers, pressure transducers, or other transducers that can monitor the operation of ancillary vehicular equipment and is particularly adaptable to provide time/temperature records of the compartments and contents of refrigerated tractors and other vehicles.

As indicated in FIG. 1, data acquisition module 11 may be connected with ultrasonic distance sensors 17 and 18. Such distance sensors may be ultrasonic sensors of the type available from Polaroid Corporation which operate by projecting a sound pulse and sensing a return pulse to permit distance calculation from the time interval and the speed of sound. The system of the invention is thus provided with means to permit the vehicle operator to monitor the distance between the back of the trailer where distance sensor 17 is located, as shown in FIG. 1, and a loading dock or other object as a tractor trailer is being backed. In addition, a vehicle operator may use sensor 18 mounted at the top of the trailer to determine clearances between the top of trailer 12 and bridges and overpasses under which trailer 12 must pass. Such distance information may be displayed on the control and display module 13 within tractor 14 as described below.

FIGS. 6–10 include the schematics of the circuit which may be incorporated into the control and display module 13, portable, control and display unit 21 and vehicle mounting unit 20.

Figure 6:
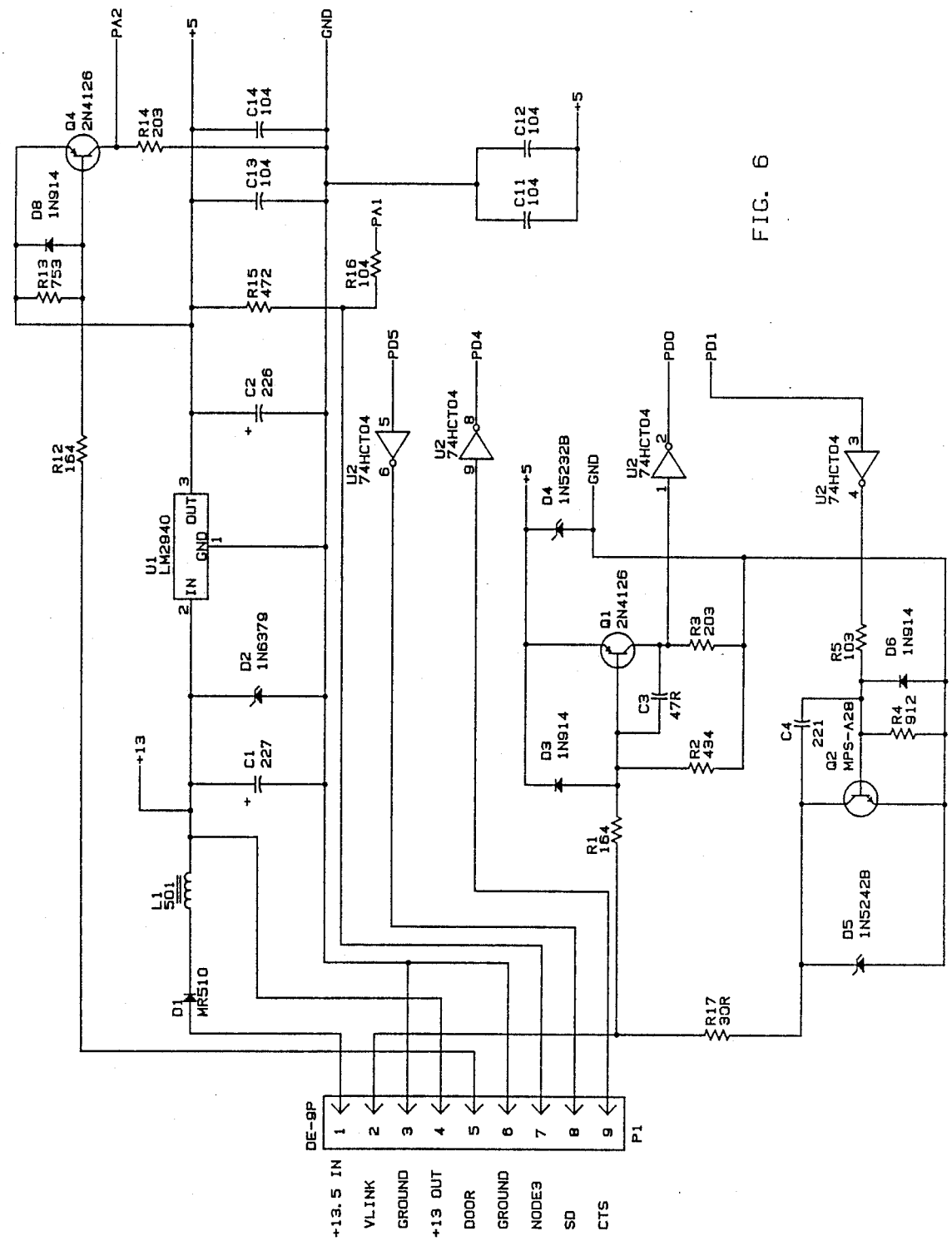
FIGS. 6-10 circuit diagrams of the control and display module of this invention.

The circuit portions shown on FIGS. 6–9 are interconnected at the corresponding terminals identified on each of the drawings and together comprise the circuit of the separate portable control and display unit 21. The connections PD0, PD1, PD4, and PD5 are connected with the corresponding terminals PD0, PD1, PD4, and PD5 of the microprocessor IC7 shown in FIG. 8. The microprocessor IC7 is preferably a microprocessor sold by Motorola under its No. 68HCL. As shown in FIG. 6, the circuit of FIGS. 6–9 is powered by a 13.5-volt D.C. input from the vehicle mounting unit 20 shown in FIG. 10 and provides a regulated, positive five volts for the operation of the circuit elements. The circuit of FIGS. 6–9 may also be battery powered for portable operation.

Figure 7:
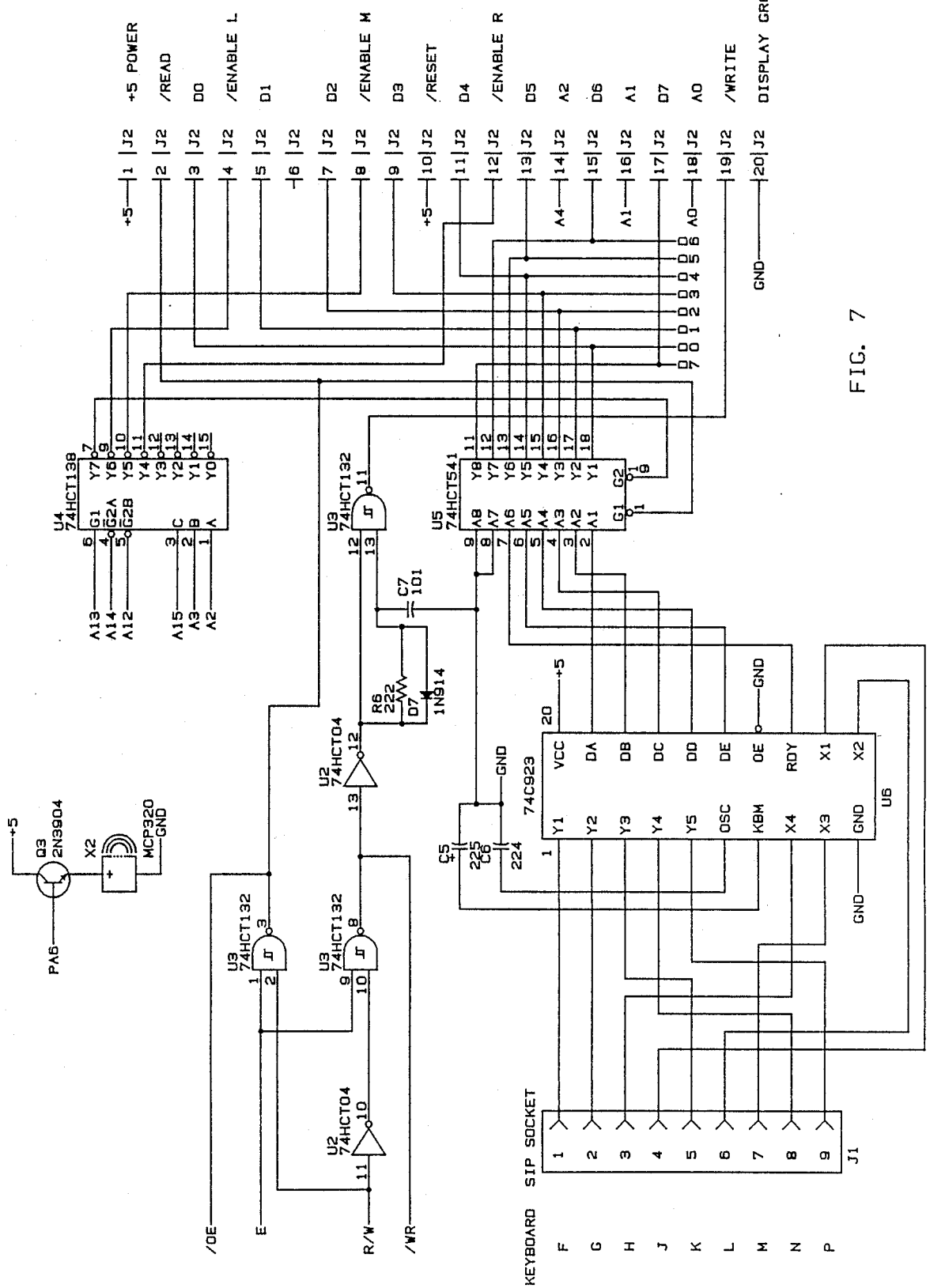
Figure 8:
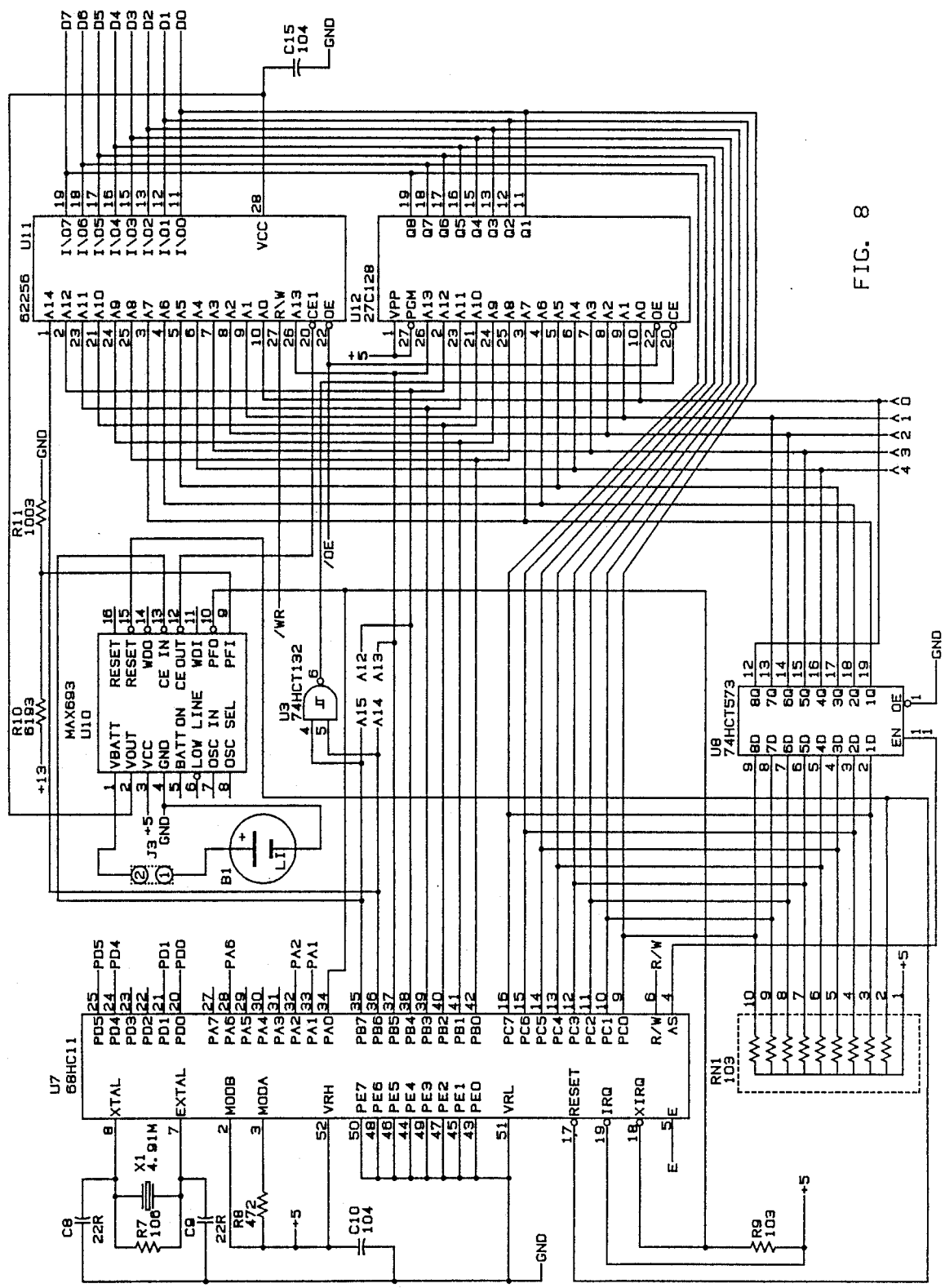

Line terminations D0–D7 at the right of the circuit portion shown on FIG. 7 connect respectively to the line terminations identified by D0–D7 at the upper right of the circuit portion shown in FIG. 8. The connections A12–A15 from IC4 at the upper center of the circuit portion shown on FIG. 7 connect to the corresponding line terminations A12–A15 located in the central portion of the circuit portion shown in FIG. 8. The line terminations A2 and A3 of circuit element IC4 of FIG. 7 connect to the line terminations A2 and A3, respectively shown at the bottom of the circuit portions shown in FIG. 8. The circuit line terminations A0, A1, and A4 at the bottom of the circuit portion shown in FIG. 8 connect to the corresponding terminals A0, A1, and A4 shown at the right of the circuit portion shown on FIG. 7 (at the terminals of connector J2 pins 18, 16, and 14, respectively). Connector J1 at the lower left of the circuit portion shown in FIG. 7 is adapted for connection with a keyboard to input information. Such a keyboard may be of the type manufactured by the Grayhill Company and sold under its part No. 86JB2-2-1. The connection J2 provides the means to interconnect the circuit of FIGS. 6–9 with data acquisition module 11.

Figure 9:
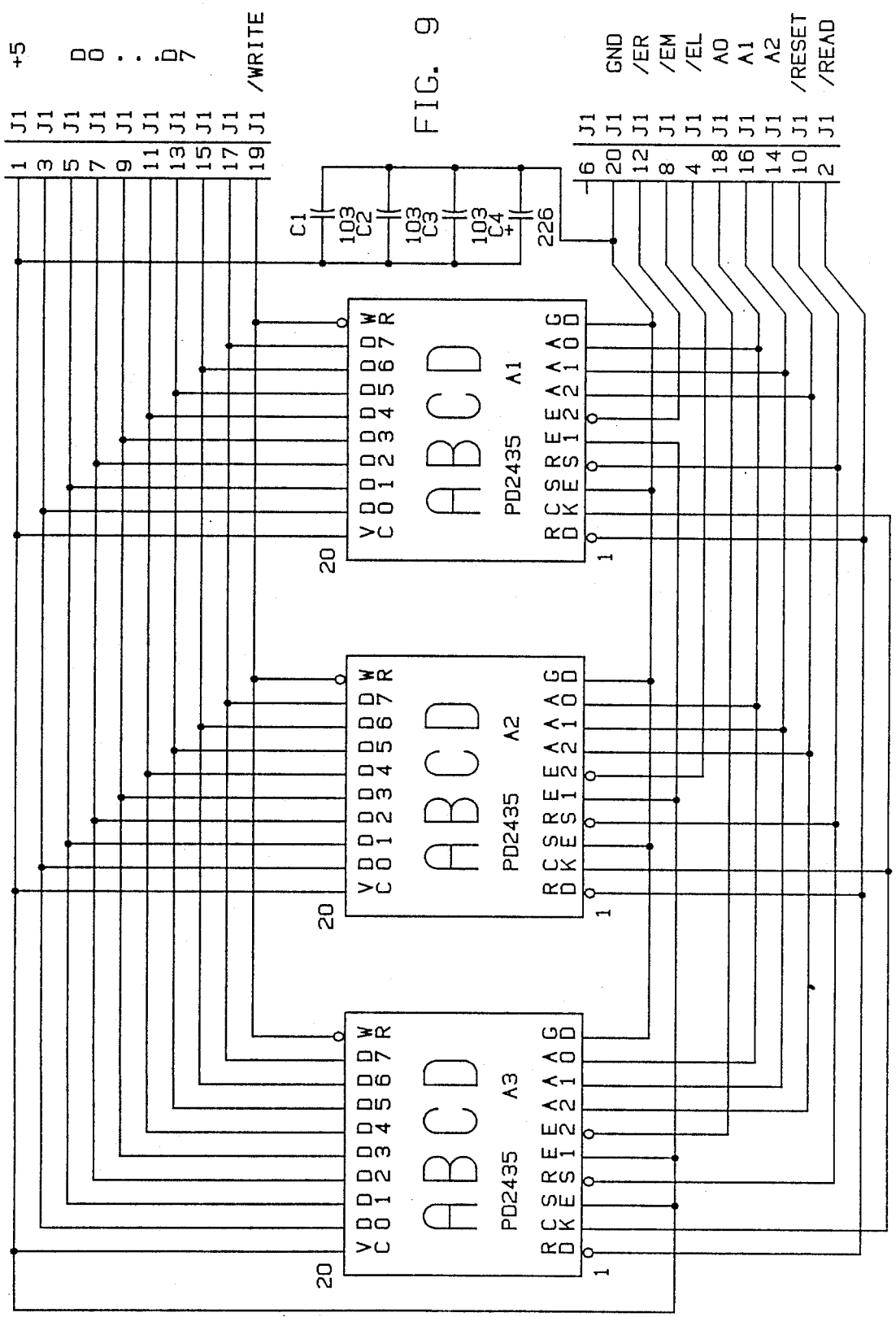

FIG. 9 shows a display board for use with FIGS. 6–8 to display temperature, pressure, or distance information available from data acquisition module 11. It should be noted that the circuit of FIGS. 6–9 provides the control and display unit 21, whether separate or mounted in a tractor with a 12-character, illuminated display, a 20-button key pad, and a vehicular network interface. The circuit of FIGS. 6–9 is preferably packaged in a separate, handheld unit that is portable and may be carried by the vehicle operator. As a handheld unit, the circuit of FIGS. 6–9 may be plugged directly into the data acquisition module 11 when the trailer is parked; and the data acquisition module may be programmed to provide alarms in the event the outputs of any of its sensors indicate unacceptable operating conditions. In addition, when the circuit of FIGS. 6–9 packaged as a separate, handheld unit is plugged directly into the data acquisition module, the history of operation of the ancillary, vehicular equipment may be downloaded into the handheld unit. Handheld units incorporated the circuit of FIGS. 6–9 have sufficient information storage to interrogate up to eight data acquisition modules 11 in sequence. The handheld unit may be used to carry the history of operation of the ancillary equipment, for example, the time/temperature records associated with a refrigerated trailer to a computer or other data processor located at a remote location. In addition, such information may be transmitted over a telephone link to remote computers by means of modems and telephone lines. The 12-character alphanumeric provides English menu prompts to minimize operator training time.

Figure 10:
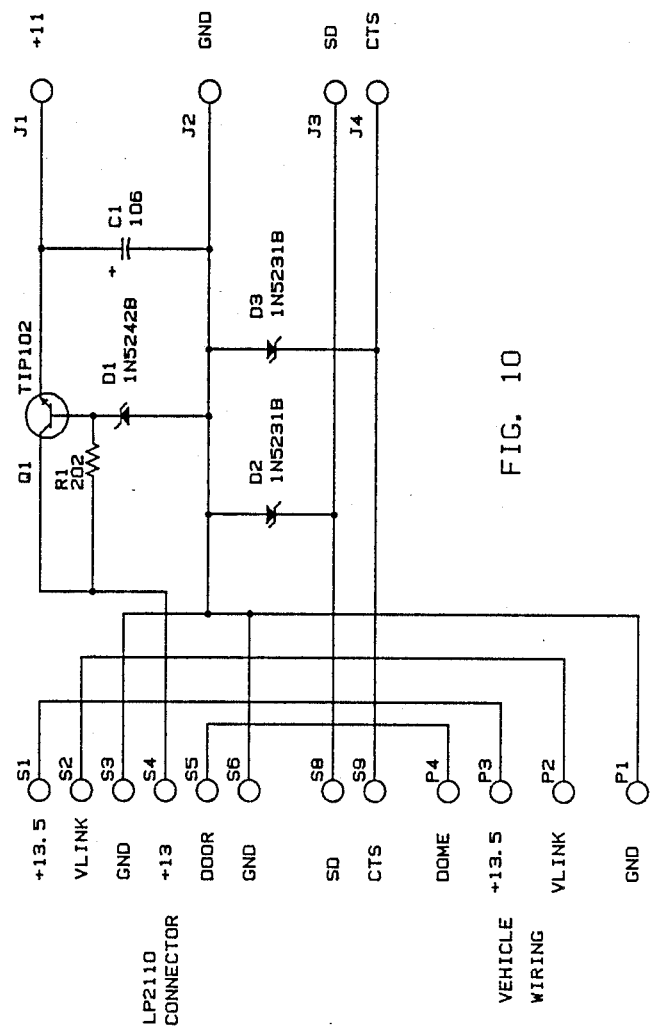

FIG. 10 is a schematic diagram of the vehicle mounting unit 20, including a printer interfacing circuit of operator control module 13. The vehicle mounting unit 20 may be permanently mounted in a tractor cab to provide a connection indicated by DE9S on FIG. 10 for the portable control and display unit including the circuit of FIGS. 6–9. The cab mount and printer including the circuit of FIG. 10 provide a 24-column printer with a power supply for printing alarm and temperature history records. The printer is preferably a Weightronics printer sold with as its No. 3602-1200-DC and uses plain two and one-half inch adding machine paper that is conveniently available.

When handheld display unit 21, including the circuit of FIGS. 6–9, is in place in the printer mount unit, the circuits of FIGS. 6–9, and FIG. 10 are interconnected by the connector DE-9 shown at the left of FIG. 6 and the left of FIG. 10. The handheld display unit and circuit of FIGS. 6–9 may be provided with a replaceable nine-volt lithium battery which can provide an expected battery life of six months with normal usage.

The portable control module 21 may also be provided with a stainless steel article temperature probe which may be used to probe article temperatures, both while attached by interfacing cable to the data acquisition module 11 or while detached for use in a warehouse or storage facility. The handheld display unit 21 has the capability of recording up to twelve time and temperature measurements and storing the time and temperature measurements for latter uploading them into data acquisition module 11 or to a remote computer at a later time. The handheld display unit 21 includes clock means and may also be provided with means to present time information and wake up or time alarm signals to the vehicle operator.

Figure 11:
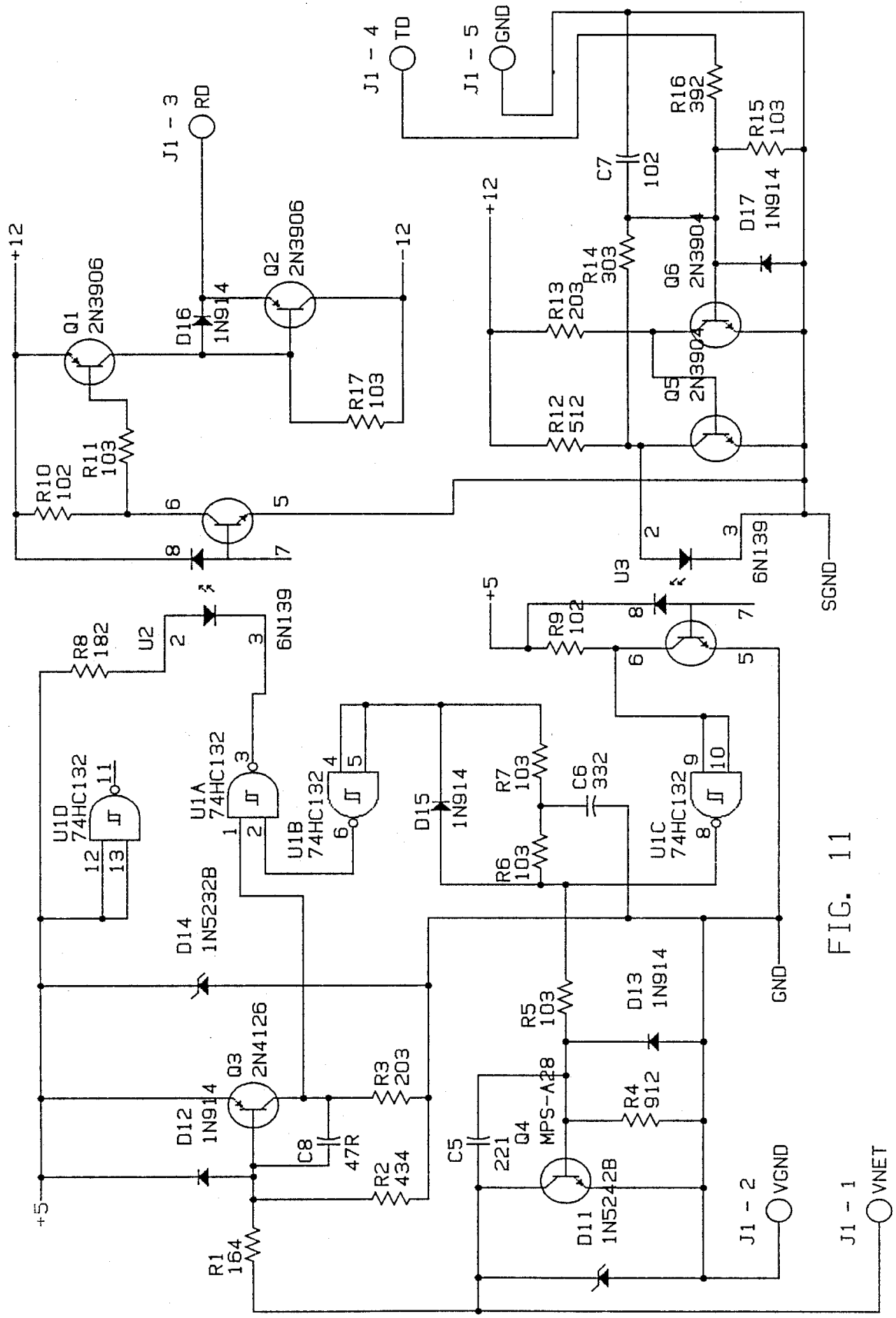
FIGS. 11 and 12 are circuit diagrams of the interface module of the system of this invention.
Figure 12:
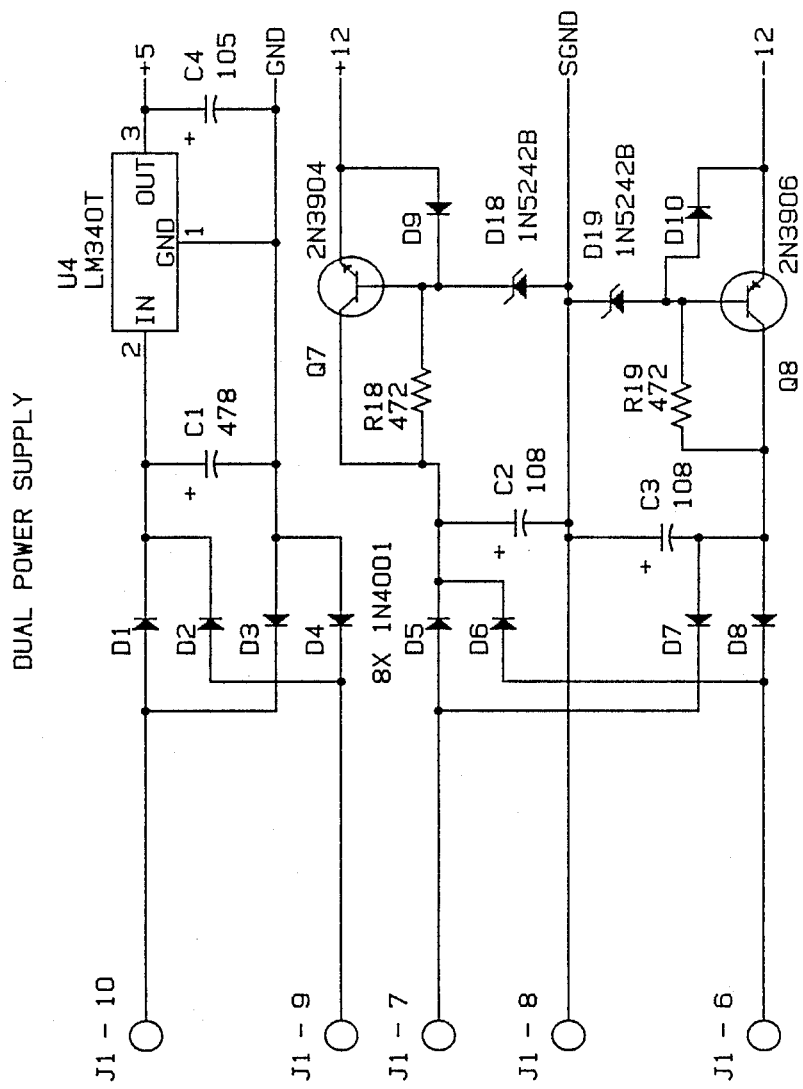

As indicated above, the system can also include an interface module 22 (FIG. 1) which is adapted to permit the data acquisition module 11 to interface with a standard RS232 data link. Such an interfacing module may be mounted inside a building or near a loading dock and can be powered from the building electrical system. FIGS. 11 and 12 are circuit diagrams of the circuit of such an interface module 22. The module of FIGS. 11 and 12 provides level translation and isolation between the building computer system and the electrical system of the vehicle. As indicated above, the interfacing module may be located inside a warehouse or unloading facility and wired to a 2183A weather-proof receptacle adjacent the unloading dock and may be plugged directly into data acquisition module 11 on parked trailer 12. The RS232 output side may be wired directly to a personal computer or to a computer remotely located at a distance of up to one hundred feet. A 2141A or 2142A multiplexer may be used to provide up to seven or fifteen channels, respectively, into a single personal computer serial port. For distances over 100 feet, a 2143A line driver transceiver pair is used.

The circuit elements of the circuit shown in FIGS. 3–12 are identified on the following list.

| FIG. 3 | |
|---|---|
| C1 | 220 uF Capacitor |
| C2 | 10 uF Capacitor |
| C3 | 4.7 pF Capacitor |
| C4 | 100 pF Capacitor |
| D1 | MR510, Rectifier |
| D2 | 1N6379, Zener Diode |
| D5, 8 | 1N5242B, Zener Diode |
| D4 | 1N5232B, Zener Diode |
| D3, 6, 7 | 1N914, Signal Diode |
| L1 | 500 uH Choke |
| Q1 | 2N4126, Transistor |
| Q2 | MPS-A28, Transistor |
| Q3 | 2N3019, Transistor |
| R1 | 160K OHM ¼ Watt 5% Resistor |
| R2 | 430K OHM ¼ Watt 5% Resistor |
| R3 | 20K OHM ¼ Watt 5% Resistor |
| R4 | 9.1K OHM ¼ Watt 5% Resistor |
| R5 | 10K OHM ¼ Watt 5% Resistor |
| R6 | 620 OHM ¼ Watt 5% Resistor |
| R7 | 1.0 M OHM ¼ Watt 5% Resistor |
| R8 | 2K OHM ¼ Watt 5% Resistor |
| U1 | LM2940, Integrated Circuit |
| U2 | 74HCT14N, Integrated Circuit |
| FIG. 4 | |
| C10–21 | 0.1 uF Capacitor |
| D9–16 | 1N5231B, Zener Diode |
| N2 | 20K OHM Resistor Network |
| N3 | 100K OHM Resistor Network |
| N4, 6 | 10K OHM Resistor Network |
| N5 | 22K OHM Resistor Network |
| Q4–7 | 2N3904, Transistor |
| R15–22 | 1650 OHM ¼ Watt 1% Resistor |
| R23 | 330 OHM ¼ Watt 5% Resistor |
| U2 | 74HCT14N, Integrated Circuit |
| FIG. 5 | |
| B1 | T04/46, Lithium Battery |
| C5, 6 | 22 pF Capacitor |
| C7, 8 | 0.1 uF Capacitor |
| C9 | 10 uF Capacitor |
| N1 | 10K OHM Resistor Network |
| R9 | 10 M OHM ¼ Watt 5% Resistor |
| R10 | 4.7K OHM ¼ Watt 5% Resistor |
| R11 | 10 OHM ¼ Watt 5% Resistor |
| R12 | 10K OHM ¼ Watt 5% Resistor |
| R13 | 619K OHM ¼ Watt 1% Resistor |
| R14 | 100K OHM ¼ Watt 1% Resistor |
| U3 | MC68HC11A1FN, Integrated Circuit |
| U4 | MAX693EPE, Integrated Circuit |
| U5 | 74HC139N, Integrated Circuit |
| U6 | 74HCT573N, Integrated Circuit |
| U7 | 6264LP-10, Integrated Circuit |
| U8 | 27C64-15JL, Integrated Circuit |
| U8 | 27C64-15JL, Integrated Circuit |
| X1 | 4.9152 MHz Crystal |
| FIG. 6 | |
| C1 | 220 uF Capacitor |
| C2 | 10 uF Capacitor |
| C3 | 4.7 pF Capacitor |
| C4 | 100 pF Capacitor |
| C11–14 | 0.1 uF Capacitor |
| D1 | MR510, Rectifier |
| D2 | 1N6379, Zener Diode |
| D3, 6 | 1N914, Signal Diode |
| D4 | 1N5232B, Zener Diode |
| D5 | 1N5242B, Zener Diode |
| L1 | 500 uH Choke |
| P1 | DE-9PA, Connector |
| Q1 | 2N4126, Transistor |
| Q2 | MPS-A28, Transistor |
| R1 | 160K OHM ¼ Watt 5% Resistor |
| R2 | 430K OHM ¼ Watt 5% Resistor |
| R3 | 20K OHM ¼ Watt 5% Resistor |
| R4 | 9.1K OHM ¼ Watt 5% Resistor |
| R5 | 10K OHM ¼ Watt 5% Resistor |
| U1 | LM2940, Integrated Circuit |

| -continued | |
|---|---|
| U2 | 74HCT14N, Integrated Circuit |
| FIG. 7 | |
| C5 | 2.2 uF Capacitor |
| C6 | 0.22 uF Capacitor |
| C7 | 100 pF Capacitor |
| D7 | 1N914, Signal Diode |
| IC2 | 74HCT04N, Integrated Circuit |
| IC3 | 74HCT132N, Integrated Circuit |
| IC4 | 74HCT138N, Integrated Circuit |
| IC5 | 74HCT541N, Integrated Circuit |
| IC6 | 74C923N, Integrated Circuit |
| J1 | 9 PIN Connector |
| Q3 | 2N3904, Transistor |
| R6 | 2.2K OHM ¼ Watt 5% Resistor |
| X2 | MCP-320 Beeper |
| FIG. 8 | |
| B1 | T04/46, Lithium Battery |
| C8, 9 | 22 pF Capacitor |
| C10, 15 | 0.1 uF Capacitor |
| RN1 | 10K OHM Resistor Network |
| R7 | 10 M OHM ¼ Watt 5% Resistor |
| R8 | 4.7K OHM ¼ Watt 5% Resistor |
| R19 | 10K OHM ¼ Watt 5% Resistor |
| R10 | 619K OHM ¼ Watt 1% Resistor |
| R11 | 100K OHM ¼ Watt 1% Resistor |
| IC7 | MC68HC11A1FN, Integrated Circuit |
| IC10 | MAX693EPE, Integrated Circuit |
| IC3 | 74HC132N, Integrated Circuit |
| IC8 | 74HCT573N, Integrated Circuit |
| IC11 | KM62256LP-10, Integrated Circuit |
| IC12 | MBM27C128-25, Integrated Circuit |
| X1 | 4.9152 MHz Crystal |
| FIG. 9 | |
| A1-3 | PD2435, Integrated Circuit Display |
| C1-3 | 0.1 uF Capacitor |
| C4 | 22 uF Capacitor |
| FIG. 10 | |
| C1 | 100 uF Capacitor |
| D1 | 1N5242B, Zener Diode |
| D2, 3 | 1N5231D Zener Diode |
| J1 | DE-95 Connector |
| Q1 | TIP-101 Transistor |
| R1 | 2K OHM ¼ Watt 5% Resistor |
| FIG. 11 | |
| C8 | 4.7 pF Capacitor |
| C5 | 100 pF Capacitor |
| C6 | 470 pF Capacitor |
| C7 | 1000 pF Capacitor |
| D12, 13, 15-17 | 1N914, Signal Diode |
| D11 | 1N5242B, Zener Diode |
| D14 | 1N5232B, Zener Diode |
| Q1, 2 | 2N3906, Transistor |
| Q3 | 2N4126, Transistor |
| Q4 | MPS-A28, Transistor |
| Q5, 6 | 160K OHM ¼ Watt 5% Resistor |
| R2 | 430K OHM ¼ Watt 5% Resistor |
| R3 | 20K OHM ¼ Watt 5% Resistor |
| R4 | 9.1K OHM ¼ Watt 5% Resistor |
| R5-7, 11, 15, 17 | 10K OHM ¼ Watt 5% Resistor |
| R8 | 1.8K OHM ¼ Watt 5% Resistor |
| R9, 10 | 1K OHM ¼ Watt 5% Resistor |
| R12 | 5.1K OHM ¼ Watt 5% Resistor |
| R13 | 20K OHM ¼ Watt 5% Resistor |
| R14 | 30K OHM ¼ Watt 5% Resistor |
| R16 | 3.9K OHM ¼ Watt 5% Resistor |
| U1 | 74HC132N, Integrated Circuit |
| U2, 3 | 6N139, Integrated Circuit |
| FIG. 12 | |
| C1 | 4700 uF Capacitor |
| C2, 3 | 1000 uF Capacitor |
| C4 | 1 uF Capacitor |
| D1-8 | 1N4004, Rectifier |
| D9, 10 | 1N914, Signal Diode |
| D18, 19 | 1N5242B, Zener Diode |
| Q7 | 2N3904, Transistor |
| Q8 | 1N3906, Transistor |
| R18, 19 | 4.7K OHM ¼ Watt 5% Resistor |
| U4 | LM340T-5.0, Integrated Circuit |

While the preceding description describes a best mode of carrying out the invention and a preferred embodiment, the invention is not limited by the preceding description but only by the scope of the invention, the prior art, and the following claims.

I claim:

1. A system for a tractor trailer vehicle, comprising:
   a data acquisition module adapted for monitoring the operation of ancillary equipment of the tractor-trailer vehicle, comprising means for the acquisition and storage of data relating to the operation of the ancillary equipment and means for providing time data associated with the data relating to the operation of the ancillary equipment; and
   a control and display module connected with said data acquisition module, said control and display module comprising a vehicle-mounting unit and a separate portable control and display unit adapted to be operable while connected to said vehicle-mounting unit and while detached therefrom,
   said separate portable control and display unit comprising means for displaying information relating to operation of said system and data relating to the operation of selected ancillary equipment, means for controlling and for entering information into said data acquisition module, means for warning a vehicle operator in the event of unsatisfactory operation of the vehicle and its ancillary equipment, and means for accessing and storing data relating to the operation of the ancillary equipment of the vehicle.

2. The system of claim 1 wherein said data acquisition module is adapted to acquire and store data relating to the operation of a refrigerated trailer and is connected with one or more temperature sensors.

3. The system of claim 2 wherein said ancillary equipment further comprises one or more distance sensors mounted on said trailer.

4. The system of claim 2 wherein said ancillary equipment comprises one or more sensors providing signals when the doors of the refrigerated trailer are open and closed.

5. The system of claim 2 wherein the data acquisition module is connected with one or more pressure transducers that sense pressures of a compressor unit of the refrigerated trailer 6. The system of claim 2 wherein said vehicle mounting unit comprises a printer adapted to print out a time-/temperature record of the operation of the refrigerated trailer.

7. A system for a tractor-trailer vehicle, comprising:
   one or more temperature sensors adapted for the measurement of temperatures within the trailer;
   one or more distance sensors located on the trailer;
   first means for the acquisition and storage of data connected with said one or more temperature sensors and said one or more distance sensors, said data acquisition and storage means comprising a microprocessor and random access memory connected with said one or more temperature sensors and said one or more distance sensors and adapted to acquire and store data on the temperature within said trailer sensed by said one or more temperature sensors and clock means connected with said microprocessor to provide time data associated with said temperature data; and
   second means for providing temperature data and distance data to the vehicle operator, for providing control of said system by the vehicle operator and for warning the vehicle operator if the temperature issued by the one or more temperature sensors is approaching an unacceptable temperature, said second means comprising a microprocessor and random access memory connected with said first means and with said one or more distance sensors, means to control and program the system, an alphanumeric display and an audible alarm, said microprocessor providing means for monitoring the temperature data of said one or more temperature sensors, for determining if said one or more temperature sensors are measuring a temperature approaching an unacceptable limit, and for operating the audible alarm, and means for monitoring the distance signals from said one or more distance sensors and for operating said alphanumeric display to present distance information to the vehicle operator.

8. The system of claim 7 wherein said one or more temperature sensors comprise a plurality of temperature sensors located in different temperature zones within the trailer to provide temperature records of the temperatures within said different temperature zones.

9. The system of claim 7 further comprising a separate interfacing means adapted for connection to said first means for reading and transmitting temperature and time data on the temperatures within said trailer, said interfacing means comprising a multiplexer to provide multiple channels of data for acceptance by a single computer.

10. The system of claim 7 wherein said second means comprises a separate portable module adapted for connection to said first and second means and for inputting data and programs to the microprocessors of said system, said separate portable module comprising said microprocessor and random access memory of the second means, said alphanumeric display and a key pad input as said means to control and program the system.

11. The system of claim 7 wherein said second means comprises printer output means.

12. The system of claim 7 further comprising sensor means for indicating the opening and closing of the trailer doors, said first means being adapted to record the opening and closing of the trailer doors and the times thereof.

13. A system for recording temperature levels of a vehicle refrigerated compartment and articles carried therein, comprising:
  first sensor means for sensing and generating a signal indicating one or more temperatures within said refrigerated compartment;
  second sensor means for sensing and generating a signal indicating the temperature of one or more articles within said refrigerated compartment;
  data processing and storage means connected with said first and second sensor means, and clock means for providing time data;
  input means connected with said data processing and storage means for inputting information on acceptable temperatures within said compartments and articles;
  output means connected with said data processing and storage means for outputting time-temperature data to provide a temperature history record of the refrigerated compartment and the articles carried therein and for providing a warning if a temperature within the refrigerated compartment or of said one or more articles is not acceptable.

14. The system of claim 13 wherein said input and output means comprises a separate display unit adapted for connection with the data-processing and storage means.

15. The system of claim 14 wherein said display unit comprises an illuminated display, a multiple button key pad, and a vehicular-mounting interface, said display unit being adapted to program said data-processing and storage means.

16. The system of claim 15 wherein said display unit is combined with a printing means.

17. The system of claim 16 wherein said display unit and printing means combination is adapted to display compartment temperatures, to provide a warning signal if the difference between an actual compartment temperature and the acceptable temperature is greater than a predetermined margin, and to print a set of time-temperature data comprising the temperatures sensed by said first sensing means and/or said second sensing means and corresponding times at which each said temperature is sensed.

18. The system of claim 14 further comprising a handheld unit adapted to be connected directly to the data-processing and storage means, said handheld unit comprising means for inputting programs and data to said data-processing and storage means.

19. The system of claim 18 wherein said handheld unit further comprises means for accessing and storing time-temperature data stored by said data-processing and storage means and means for providing a data output signal.

20. The system of claim 19 wherein the data output signal comprises an alphanumeric data display.

21. The system of claim 19 wherein said handheld unit is adapted to be connected to a second data-processing means remote from said refrigerated compartment, whereby data stored in the handheld unit may be separately transported and inputted to the second data-processing means.

22. The system of claim 18 wherein the handheld unit further comprises means for generating prompting instructions to an operator via the alphanumeric display.

23. The system of claim 13 further comprising a handheld temperature probe, said probe being adapted for connection to said data-processing and storage means whereby upon contact of said temperature probe with articles to be carried within said refrigerated compartment, said temperature probe senses the temperature of the articles and provides data comprising article temperatures to said data-processing and storage means.

24. The system of claim 23 wherein said handheld temperature probe further comprises means to store said article temperatures and the times said article temperatures were sensed.

25. The system of claim 23 wherein said handheld temperature probe is provided with a visual display means whereby the article temperatures measured by the probe may be substantially instantaneously displayed.

26. The system of claim 23 wherein said handheld temperatures probe is capable of sensing article temperature while detached from the data-processing and storage means, and further comprises means for storing article-temperature data and the times of said measurements and means for providing such time-temperature data subsequently upon command.

27. The system of claim 23 further comprising a self-contained, battery powered unit including:
  an illuminated temperature display; and
  interfacing means to connect said temperature-measuring probe to said data-processing and storage means.

* * * * *